G. A. JOHNSTONE.
HIGH FREQUENCY MOTOR ALTERNATOR.
APPLICATION FILED OCT. 7, 1918.

1,375,393.

Patented Apr. 19, 1921.
5 SHEETS—SHEET 1.

G. A. JOHNSTONE.
HIGH FREQUENCY MOTOR ALTERNATOR.
APPLICATION FILED OCT. 7, 1918.

1,375,393.

Patented Apr. 19, 1921.
5 SHEETS—SHEET 5.

Inventor:
George A. Johnstone,

UNITED STATES PATENT OFFICE.

GEORGE A. JOHNSTONE, OF CHICAGO, ILLINOIS.

HIGH-FREQUENCY MOTOR-ALTERNATOR.

1,375,393.  Specification of Letters Patent.  Patented Apr. 19, 1921.

Application filed October 7, 1918. Serial No. 257,162.

*To all whom it may concern:*

Be it known that I, GEORGE A. JOHNSTONE, a citizen of the United States, residing at Chicago, in the county of Cook and State of Illinois, have invented a new and useful Improvement in High-Frequency Motor-Alternators of which the following is a specification.

My invention relates to improvements in dynamo electric machinery, and more particularly to a design of alternator of medium high frequency and intended for use in field wireless telegraph work. In general, the machine of the present invention has a direct-current magnetic system embodying multipolar fields of fixed polarity, distinguishing in this respect from the unipolar inductor alternators which have been in common use in the service.

In the accompanying drawings I have illustrated various forms of machine in accordance with the invention.

Figure 1:
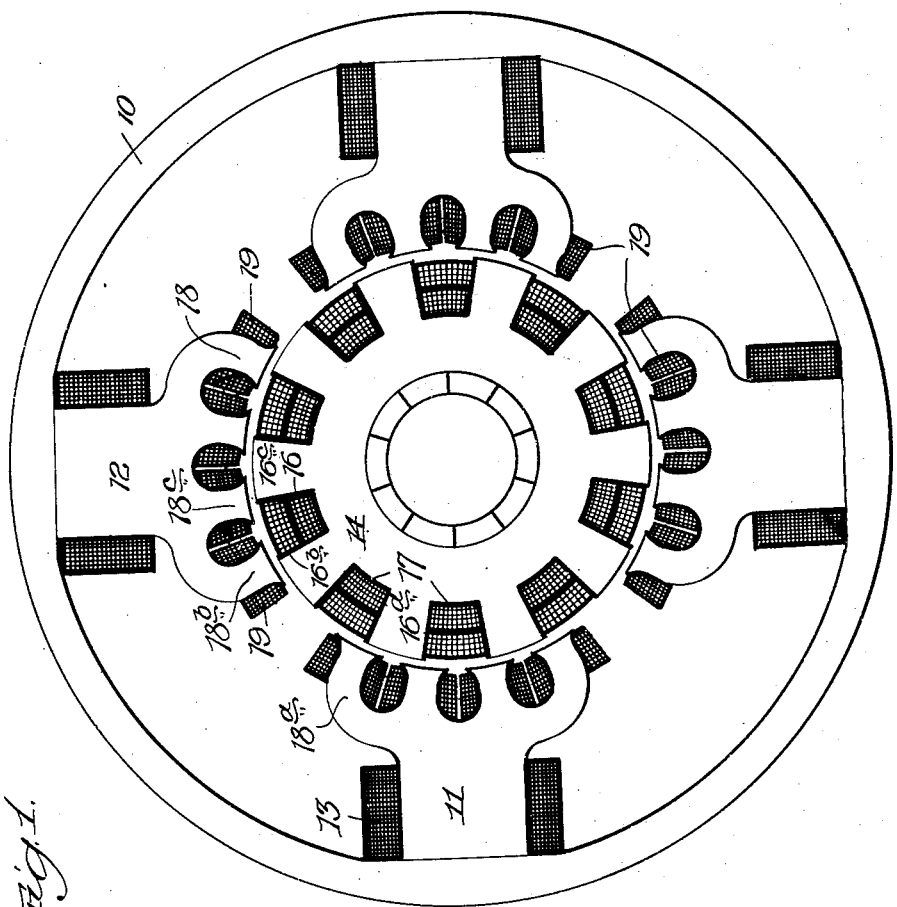
Figure 2:
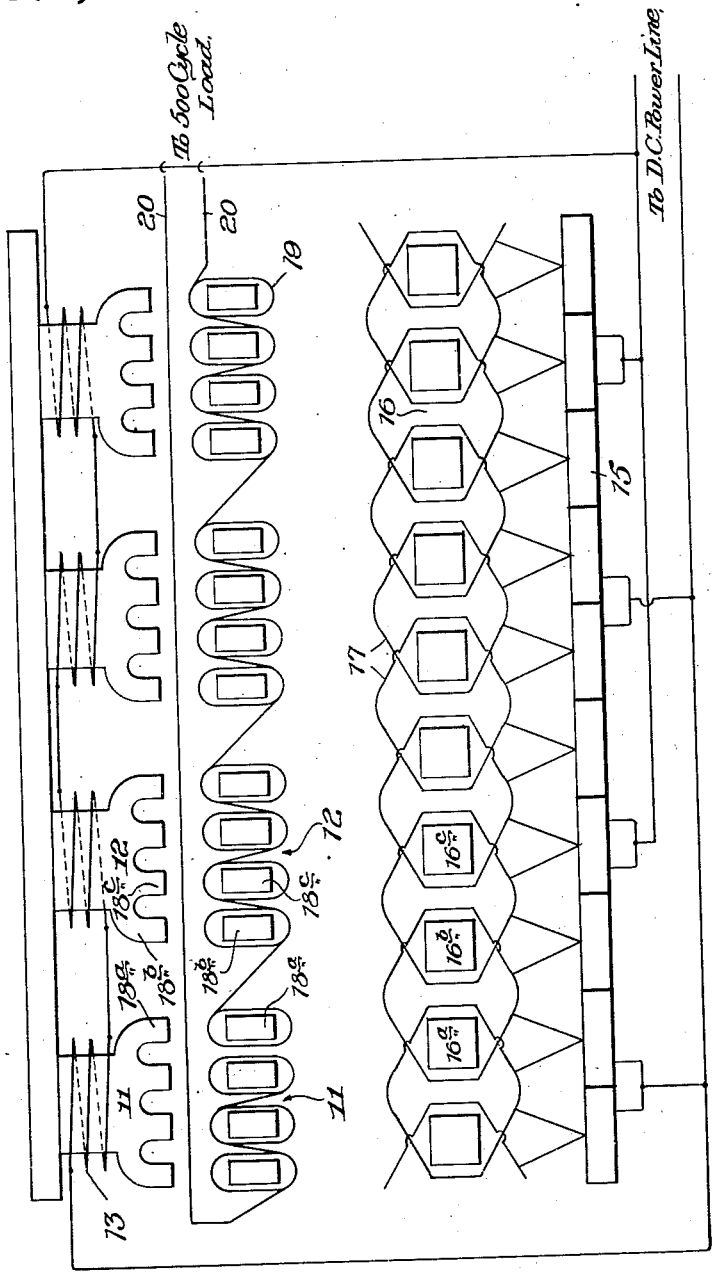
Figure 3:
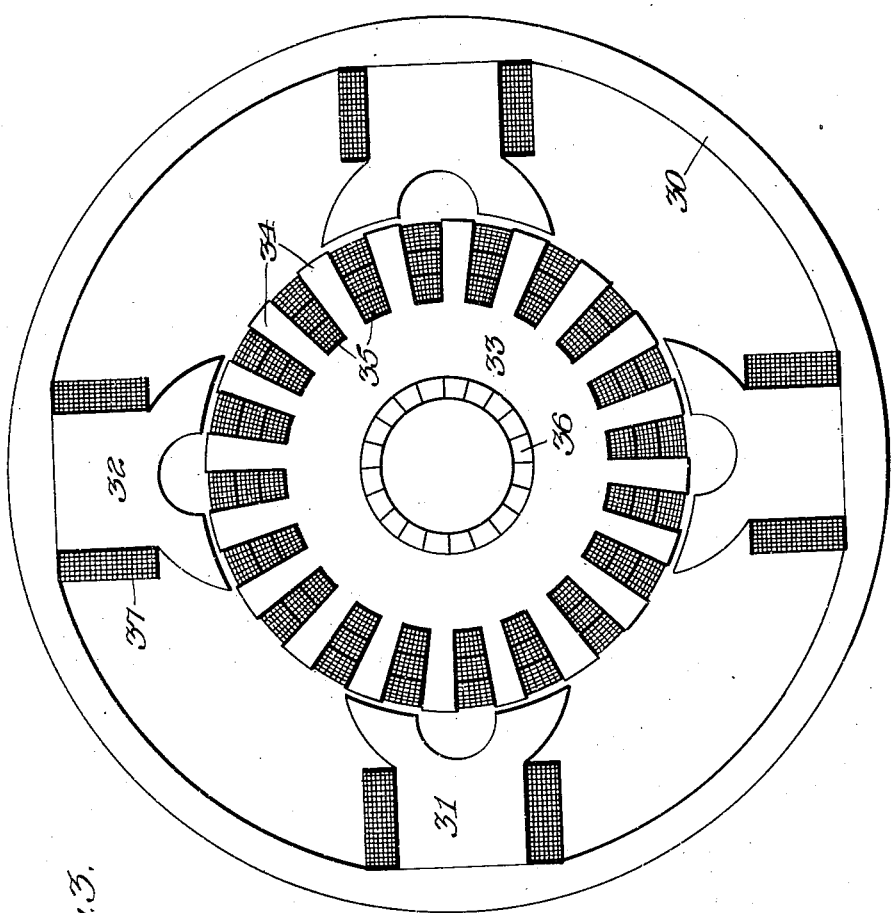
Figure 4:
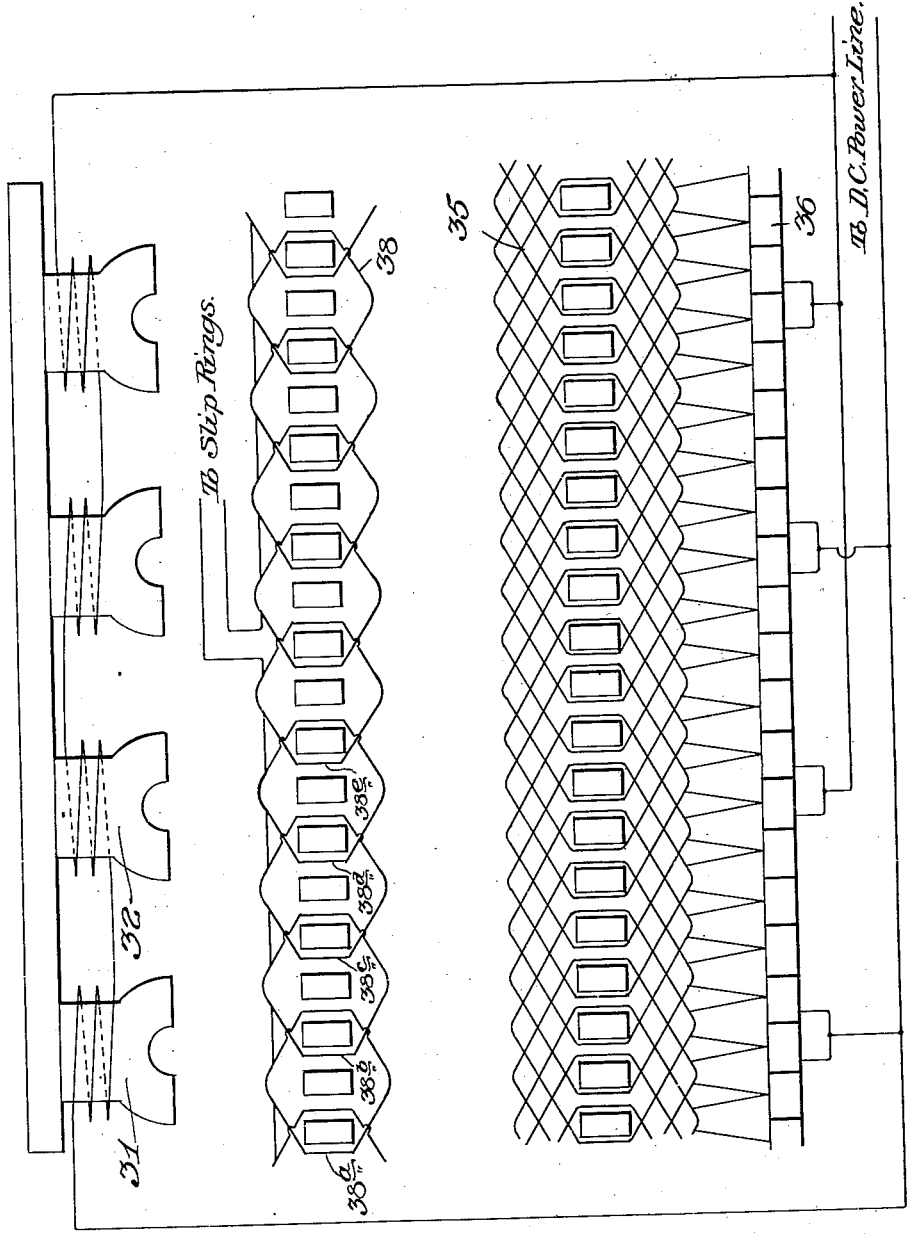
Figure 5:
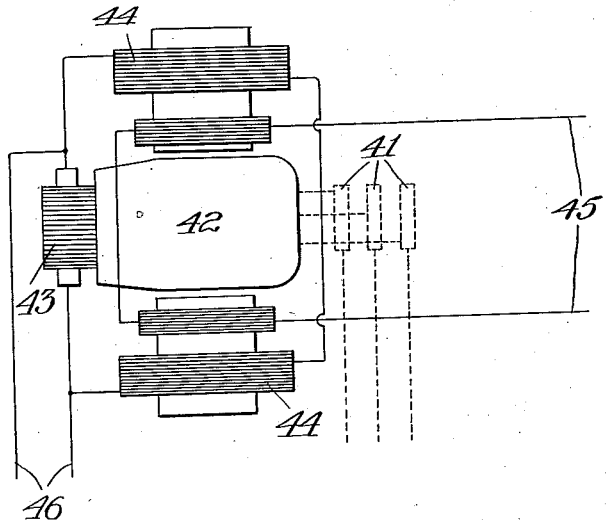
Figure 6:
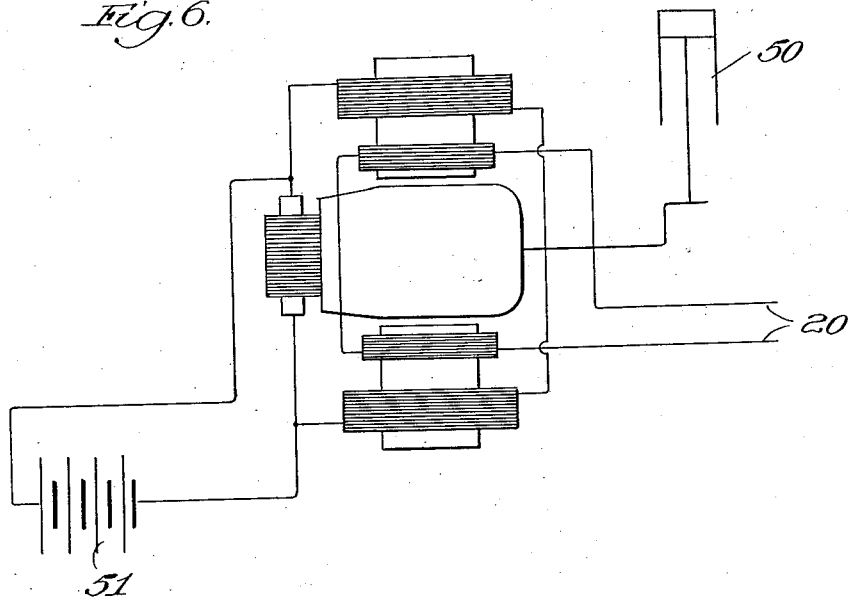

Figure 1 is a diagrammatic cross-section of a motor alternator; Fig. 2 is a wiring diagram of the same; Fig. 3 is a diagrammatic cross-section of a modified motor alternator in which the A. C. windings are carried by the rotating armature; Fig. 4 is a wiring diagram of the machine of Fig. 3; Fig. 5 is a diagrammatic elevation of a three-phase motor alternator; and Fig. 6 is a diagrammatic elevation of an engine-driven motor alternator illustrating connections for employing the machine either as a motor or as a generator for charging a battery.

Referring first to Fig. 1, the machine there illustrated has a four-pole frame of conventional type, designated 10, an adjacent pair of the four poles, which will, of course, be of opposite polarity, being designated by the numerals 11 and 12. Each pole is wound with the usual direct-current field winding 13. The armature designated 14 is of the conventional direct-current rotor type having a commutator 15, and a rather coarsely slotted core, the slots of which are designated 16. In these slots are located the direct-current armature windings 17 connected with the commutator in the usual way.

In order to employ this machine, which is essentially a direct-current motor as described, as an alternator of medium high frequency, the faces of the pole are notched to provide teeth 18 of a pitch half as great as that of the armature teeth, that is, the angular interval occupied by the two adjacent teeth 18 and notches is equal to the angular interval of one of the armature teeth and notches 16. The pole teeth 18 have wound upon them the coils 19 of the high frequency winding, and as is shown in Fig. 2, the direction of this high frequency winding on, for example, the pole 12, is opposite that of the same winding on the adjacent pole 11. All of the alternating current windings on the pole teeth 18 will ordinarily be in series, since a high E. M. F. rather than a heavy current is required in this type of service.

With regard to the operation of the structure described as a direct-current motor, it is believed that the same will be perfectly clear, the construction and arrangement of the field, armature and commutator being that followed in standard practice in this respect. Assuming, therefore, that the machine described is operating as a direct-current motor, the field being continuously excited and maintaining at all times a fixed polarity, it will be seen that the windings 19 on the pole teeth 18 will generate an alternating electromotive force of approximate sine form as each of the armature teeth passes over a pole tooth since the flux in the pole 18 alternately increases and decreases as the teeth and intervening slots alternately pass the pole. With respect to the winding of any single pole tooth 18, it is therefore apparent that the same will deliver an alternating current of a frequency equal to the R. P. M. of the armature multiplied by the number of armature teeth. It so happens that within the limits of commercial speeds, and standard notched armature construction, the required medium high frequency of, per example, 500 cycles per second, in use in small portable wireless telegraph generating outfits, may easily be obtained.

Assuming that each of the windings on the pole teeth 18 therefore produces alternating current of the proper frequency, it becomes necessary to give these windings such angular relation as to permit them to be connected as a single operating circuit. The diagram of Fig. 2 represents the manner in which this is accomplished. Thus it will be seen that adjacent teeth 18 of any single pole are wound in opposite directions, while owing to the gap between poles, the last tooth of one pole is wound in the same direction as the first tooth of the next adjacent pole in that direction. The manner of connecting these windings will be more clear from the following example:

Considering the winding on the pole tooth 18ª of the pole 11, it will be noted that the armature tooth 16ª is approaching this tooth. The next adjacent tooth 18ᵇ which lies on the pole 12 (a pole of opposite polarity) likewise has an armature tooth 16ᵇ approaching it. Because of the opposite polarity of the direct-current poles 11 and 12, the electromotive force set up in the windings of the two pole teeth 18ª and 18ᵇ would be opposite in direction, and it is therefore necessary that these two coils be wound in opposite directions, as is clearly shown in Fig. 2. The next pole tooth in the direction of rotation is designated 18ᶜ, and it will be noted that the armature tooth 16ᶜ is receding from this pole tooth, the electromotive force set up in the winding of the tooth 18ᶜ being therefore in a direction opposite to that set up in the tooth 18ᵇ of the same pole; this winding is likewise connected so that it is wound in the opposite direction from that of the adjacent tooth 18ᵇ. It therefore appears that by connecting them in the manner described the windings of the teeth 18ª (pole 11) and teeth 18ᵇ, 18ᶜ (pole 12) may be connected in series, the electromotive force in each being in the same direction at any instant. Following the diagrams of Fig. 1 and Fig. 2 for the rest of the periphery of the armature, it will be seen that this same relative arrangement and action of the teeth and windings is represented. All of the windings 19 may therefore be connected in series as represented by the lines 20 in Fig. 2, and there is thus available an alternating current of medium high frequency, for example 500 cycles per second and of a relatively high electro motive force. It is to be particularly noted with respect to the construction illustrated by Figs. 1 and 2 that the 500 cycle current is obtained from stationary windings so that it is available for use without the interposition of slip rings. This is particularly valuable in wireless telegraph service, for the reason that the inequalities of resistance of a brush operating upon a sliding contact surface such as a slip ring, often interferes with the operation of the radio telegraph system.

As shown in Fig. 1, I consider it advisable to cause the ends of the pole teeth 18 to slightly overhang the notches, thus giving a more uniform flux distribution and better wave form.

In Figs. 3 and 4 I have illustrated a modified motor alternator construction in accordance with the invention, the high frequency A. C. windings being here located in slots of the rotating armature. Referring more particularly to this construction, the motor frame which is designated 30 has four symmetrically arranged poles, two of which are designated by the numerals 31 and 32. The rotating armature designated 33 has a rather finely slotted periphery, the teeth of which are designated 34. The armature has the usual direct current winding 35 connected with the commutator 36, leads from the brushes of the latter energizing the field windings 37.

In order to cause the direct current motor illustrated in Figs. 3 and 4 to operate as a generator of high frequency alternating current, the faces of the field poles are bifurcated, giving two pole teeth to each pole, the pitch of the pole teeth being one-half that of the armature teeth. To coöperate with this arrangement of the teeth of the armature and poles there are provided alternating current windings 38, each coil of which embraces three armature teeth. The A. C. windings 38 of Figs. 3 and 4, unlike the windings 19 of construction of Figs. 1 and 2, are wound continuously in series and in the same direction through the entire periphery of the armature, this arrangement being made possible by the relative positions and pitches of the armature and pole teeth, and of the coils 38. The manner in which these coils operate to produce an alternating electromotive force which is in the same direction at any instant in all of the coils will be clear from the following. Considering the left hand end 38ª of one of the coils 38 in Fig. 4, it will be noted that the latter is opposite a space outside of the pole 31. The left hand side 38ᵇ of the next adjacent coil is likewise opposite a space (the space between teeth of the pole 31). The left hand side of the next adjacent coil designated 38ᶜ is also opposite the space between the poles 31 and 32. The left hand side of the next adjacent coil 38ᵈ will be seen, however, to lie opposite the first tooth of the pole 32. This is as it should be, for the pole 32 is of opposite polarity with respect to the pole 31. So also the left hand side of the next coil 38ᵉ is opposite a tooth of the pole 32, and for the same reason. In this manner the winding may be followed throughout the periphery of the armature, it being apparent that the corresponding sides of the coils will at all times occupy a proper relative position to the field poles, or more accurately to the teeth thereof. It will be noted that in the construction shown in Figs. 3 and 4, the number of teeth in the armature is a multiple of the number of field poles, so that the position of the armature teeth in any quadrant of the field is the same as the relative position in any other quadrant. The necessary electrical reversal of the positions of the windings required by the opposite polarity of adjacent poles is therefore attained by lapping the windings and causing them to embrace the proper number of armature teeth, to gain the result heretofore described.

The A. C. windings 38 of Figs. 3 and 4, being mounted on the armature or rotor must be connected to slip rings, as shown by the legend on the drawing.

In Fig. 5 I have illustrated a motor alternator which operates as a motor on 3 phase alternating current, and might therefore be described as a frequency converter. The slip rings for the 3 phase current are designated 41, and are mounted on the opposite end of the armature 42 from the commutator 43. The direct current brushes of the latter have connections for energizing the stator field coils 44. The machine may also of course be used on a D. C. line as a rotary converter delivering 3 phase current. The high frequency A. C. winding is in this example applied to the poles as in Figs. 1 and 2, so that the A. C. leads may be taken off, as shown at 45, without the use of slip rings. The D. C. leads designated 46 may be used for supplying power to an external circuit for any purpose, it being apparent that the output of the machine will be the total of the D. C. load, and the high frequency load, these loads being capable of being divided in any proportion.

In Fig. 6, I have illustrated a motor alternator which may be of the design shown in Figs. 1 and 2, direct connected with the gas engine 50, which is diagrammatically shown as having its crank connected to the extended armature shaft. The direct current leads from the commutator brushes of this machine may be connected with the storage battery 51.

The layout of storage battery, motor alternator and engine, diagrammatically shown in Fig. 6, is particularly intended for portable radio telegraph outfits. In the operation of this system the battery 51 will operate the motor in the usual way for the purpose of starting the gas engine 50. As the engine comes into operation and speeds up, the motor reverses its functions and becomes a generator for recharging storage battery 51 as well as for providing current for lighting or auxiliary power apparatus. The high frequency A. C. current is taken from the leads 20, which are directly connected to the stationary windings as shown in Figs. 1 and 2. As in the case of the construction shown in Fig. 5, the output of the machine will represent the sum of the loads applied to the direct current and alternating current sides.

From the foregoing specification it will be clear that it is possible in accordance with the present invention to utilize any standard type of dynamo electric machine having a direct current magnetic system, as a generator for providing alternating current of the frequency required for radio telegraph work; this modification of the standard type of machine requiring only an unsubstantial increase in the size and weight and falling far short of the cost, complication and weight of the two-unit systems comprising an independent motor and an inductor alternator or the like which is now common practice in this art. The machine of the present invention lends itself particularly well to combination with a gas engine and a storage battery, so that the whole may constitute a complete unit of minimum size and weight for army field radio telegraph use.

While I have described in considerable detail some specific embodiments of my invention, it is to be understood that this is illustrative only and for the purpose of making the principle of the invention more clear, and that the invention is not limited to the particular constructions described except in so far as such limitations form a part of the accompanying claim in which it is my intention to claim all novelty inherent in the invention as broadly as is permissible in view of the prior art. In the claim the term "Multipolar" is intended to include bipolar machines as well as those having more than two poles.

What I claim is:

The combination with a gas engine and a storage battery of a motor alternator having its shaft connected with that of the gas engine, the said motor alternator having a direct current field system and a direct current winding whereby it may run as a motor for starting said gas engine on current supplied by the said battery and as a generator for charging the said battery with power supplied by the engine, and an alternating current winding giving a frequency higher than that resulting from the number of main poles and comprising conductors which are inductively operated upon simultaneously, said conductors being connected into a single circuit and spaced so that the electro-motive force generated is in the same direction at any instant throughout the circuit, whereby the device may be utilized in radio signaling.

GEORGE A. JOHNSTONE.